June 11, 1940.  W. VAN B. ROBERTS  2,204,052
DIRECTIVE SIGNALING
Filed May 6, 1937
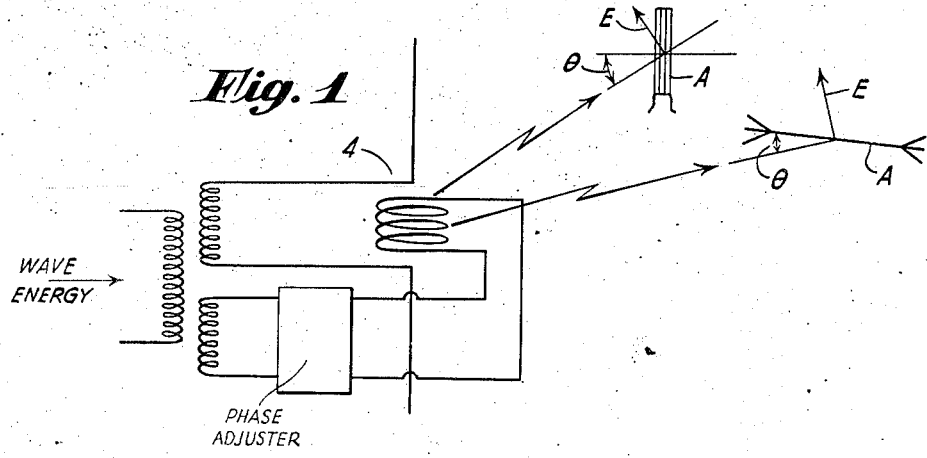
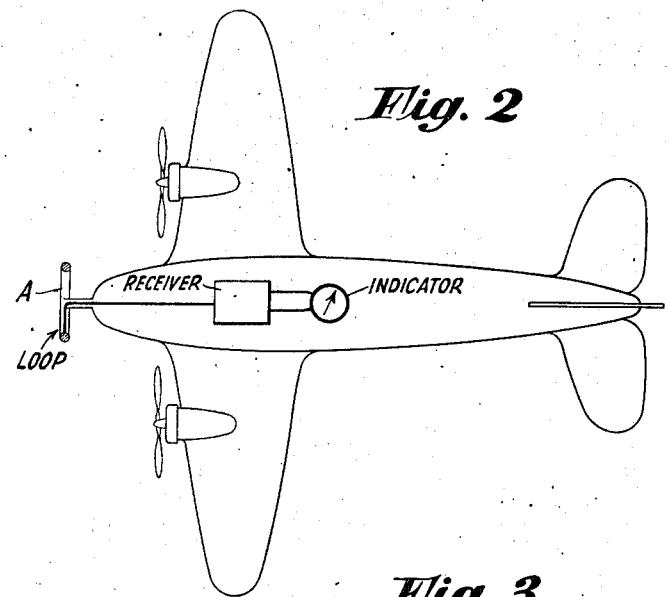
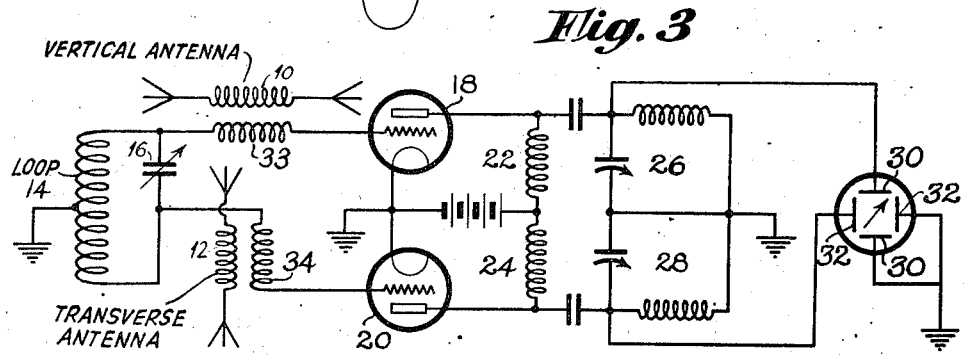
INVENTOR
W. VAN B. ROBERTS
BY
ATTORNEY Patented June 11, 1940

2,204,052

UNITED STATES PATENT OFFICE 2,204,052

DIRECTIVE SIGNALING

Walter van B. Roberts, Princeton, N. J., assignor to Radio Corporation of America, a corporation of Delaware Application May 6, 1937, Serial No. 141,023

4 Claims. (Cl. 250—11)

This application concerns a new and improved method of and means for determining the tangent plane to a spherical wave front.

In describing my invention reference will be made to the attached drawing wherein, Figure 1 illustrates the nature of the wave used and the manner in which the aerial system of my present invention gives a true indication of the direction and sense of direction of the wave source;

Figure 2 shows diagrammatically one manner of installing the directive aerials of this invention on a mobile craft, such as for example, a plane; and Figure 3 shows a modified form of my directional receiving system with means in the form of a cathode ray tube for indicating the direction of flight of the plane.

The ordinary loop antenna direction finder determines only the vertical plane in which the direction of propagation of a wave lies. In some cases it is desirable to determine the actual direction of propagation, that is, both the vertical and horizontal angles between an axis of reference and the direction of propagation. For instance, it is desired for the purpose of blind landing of aeroplanes to detect both the vertical angle and the horizontal angle between the line of flight and the line of direction from the ship to a ground transmitting station.

According to the invention this may be accomplished by the use of an ordinary loop antenna on the ship provided the ground station emits waves with rotary polarization. (Transmitting arrangements for emitting waves with rotary polarization are described in my Patent #2,174,353, issued Sept. 26, 1939.) For if a loop antenna is exposed to waves with rotary polarization there is only a single direction in which the axis of the loop can lie without the rotating magnetic vector in the wave cutting the loop and setting up voltage and this direction coincides with the direction of propagation of the wave and hence in most cases with the direction in which the transmitter lies. Thus, if the loop is mounted in gimbals or fixed with its axis parallel to the line of flight of the plane the operator needs only to adjust the loop to the position of zero pick up or the pilot to alter the line of flight to obtain zero pick-up and its axis will be then pointing directly at the ground station. A receiver connected with the aerial may control an indicator which indicates when the aerial is in a position at which no signal is received. It may be assumed that auxiliary means are at hand for insuring that the plane is flying in the correct sense along the line of direction from the ground station through the plane or by observing the direction of movement of the indicator pointer as the ship is warped the sense of direction can be determined.

It is also possible to utilize an open type of antenna for the same purpose. For example, if an open dipole type of antenna is mounted in gimbals or as before fixed along the direction of flight, then the only position in which the antenna can be adjusted without picking up voltage from the rotary polarized wave is the position such that its axis is pointing directly toward the ground station. Any deviation from this position causes the antenna line to have a component in the plane of the wave front and hence coinciding with the direction of the rotating electric field twice per cycle of its rotation.

In Figure 1, a source of elliptically and preferably circularly polarized wave energy indicated schematically at 4 which may be as illustrated in my aforesaid application is assumed to be radiating a resultant field in which directive aerials A mounted on mobile craft are located. The radiant energy produces an electric field E at right angles to the line joining the aerials A and transmitter 4. If the aerials A are oriented by maneuvering the planes so that their axes are at right angles to the plane of rotation of the electric field E no voltage or current will be set up in said aerials A. This absence of energy may act through a receiver to produce a null indication. If the axis of the loop A or of the linear conductor A deviates in any respect from its right angle relation to E a current will be produced to actuate a receiver and indication to denote the said deviation. For small angles of deviation the voltages picked up by the aerials A will vary as E sin $\theta$ (the angle of deviation).

The aerials A may be rigidly or fixedly mounted on the mobile craft, say, as indicated in Figure 2, and the latter maneuvered to place the aerials in a null position. In this case the receiver including the antennae may comprise a direction finder of the homing type. The plane operator can, by holding the plane in such a position that null indication is maintained, fly directly to the transmitter station which may then be located on a landing field for blind landing purposes.

The directive aerials A may, however, be arranged for rotation in any direction by mounting the same on gimbals in the usual manner. The physical aspects of the aerial mountings are matters of design and need not be illustrated here.

Any known mountings such as shown by Pickard #1,718,431 issued June 25, 1929, may be used or mountings to suit each particular lay-out may be devised.

In a preferred embodiment the directive aerial is mounted on the forward part of the plane as shown in Figure 2, so that it is clear of the propellers, motors, etc. The aerial A may be connected to a receiver which is in turn connected to an indicator as shown in Figure 2.

In the arrangement of Figure 3 two linear antennae 10 and 12 which may be dipoles are mounted, one vertical and the other transverse of the first and the plane. A loop 14 with its axis in the line of flight (as in Figure 2) is tuned by means 16 and connected to the grids of tubes 18 and 20, the anodes of which are included in direct current circuits 22 and 24 and in alternating current circuits 26 and 28. The alternating current circuits 26, 28 are connected to pairs of plates 30 and 32 of a cathode ray tube. Vertical antenna 10 is coupled by inductances 33 to the grid of 18 while vertical antenna 12 is coupled by inductances 34 to the grid of 20. The voltages picked up by the antennae 10 and 12 act through amplifiers 18 and 20 to produce on the plates 30 and 32 voltages in phase quadrature to cause the cathode ray to follow a circular trace on the target. The loop voltage, as in Figure 1, has a phase determined by the clock position of line of flight of the plane with respect to the transmitter sending out the rotary polarized wave. This voltage added to those picked up by 10 and 12 distorts the aforesaid circular trace in a manner characteristic of the deviation of the plane from a line between it and the transmitter. With suitable orientation of the oscilloscope or cathode ray tube, we may obtain the following results:

With vertical deviation alone of the plane relative to its correct line of flight the circular trace will be elongated in a vertical sense or compressed in a horizontal sense. With horizontal deviation alone the circular trace will be elongated in a direction inclined to the right or left or compressed in a direction inclined to the left or right. Thus, the operator, by holding the plane in such a position that the trace is circular, knows he is on his course.

It is not necessary to put the loop voltage on both deflecting plates but this is desirable to maintain symmetry. Also the loop voltage need not be applied push-pull because proper orientation of the oscilloscope insures correct phase relation to produce the circular trace when the line of flight is correct and distorted, indicating traces when the plane deviates from the line of flight.

I claim:

1. In a system for directive signaling by means of propagated wave energy having a field which in all directions from the source of propagation, is elliptically polarized and whose electric and magnetic vector is in a plane at right angles to a line from any selected point to said source, a loop antenna, a pair of electron discharge devices each having a control grid and an output electrode, inductances connecting said loop antenna in push-pull relation between said control grids, linear antennae mounted at right angles to each other, means for impressing voltage from one of said linear antennae on one of said inductances and from another of said linear antennae on another of said inductances, a cathode ray tube having pairs of deflecting plates, and means coupling the output electrodes of said discharge devices to different pairs of said deflecting plates to influence the tube ray in accordance with voltages picked up by said antennae.

2. In a system for directive signaling by means of propagated wave energy having a field which in all directions from the source of propagation is elliptically polarized and whose electric and magnetic vector is in a plane at right angles to a line from any selected point to said source, a loop antenna, a pair of electron discharge devices each having a control grid and an output electrode, means connecting said loop antenna in push-pull relation between said control grids, linear antennae mounted at right angles to each other, means for impressing voltage from one of said linear antennae on one of said control grids and from another of said linear antennae on another of said control grids, a cathode ray tube having pairs of deflecting plates and means coupling the output electrodes of said discharge tubes to different pairs of deflecting plates to influence the tube ray in accordance with voltages picked up by said antennae.

3. In a system for directive signaling by means of propagated wave energy having a field which in all directions from the source of propagation is elliptically polarized and whose electric and magnetic vector is in a plane at right angles to a line from any selected point to said source, a loop antenna, a pair of electron discharge devices each having a control grid and an output electrode, means connecting said loop antenna in push-pull relation between said control grids, linear antennae mounted at right angles to each other in a plane parallel to said loop antenna, means for impressing voltage from one of said linear antennae on one of said control grids and from another of said linear antennae on another of said control grids, a cathode ray tube having pairs of deflecting plates and means coupling the output electrodes of said discharge tubes to different pairs of deflecting plates to influence the tube ray in accordance with voltages picked up by said antennae.

4. In a system for directive signaling by means of propagated wave energy having a field which in all directions from the source of propagation is elliptically polarized and whose electric and magnetic vector is in a plane at right angles to a line from any selected point to said source, a loop antenna, a pair of linear antennae mounted at right angles to each other and parallel to said loop antenna, a cathode ray tube having pairs of deflecting plates, means coupling said loop antenna to different pairs of deflecting plates whereby the tube ray is influenced in accordance with the departure of said loop antenna from said plane and means for coupling each of said linear antennae to a pair of deflecting plates to influence the tube ray in accordance with voltages picked up by said linear antennae whereby the direction of said departure is indicated.

WALTER van B. ROBERTS.